Inventor
DON HEYER,
By
Attorney

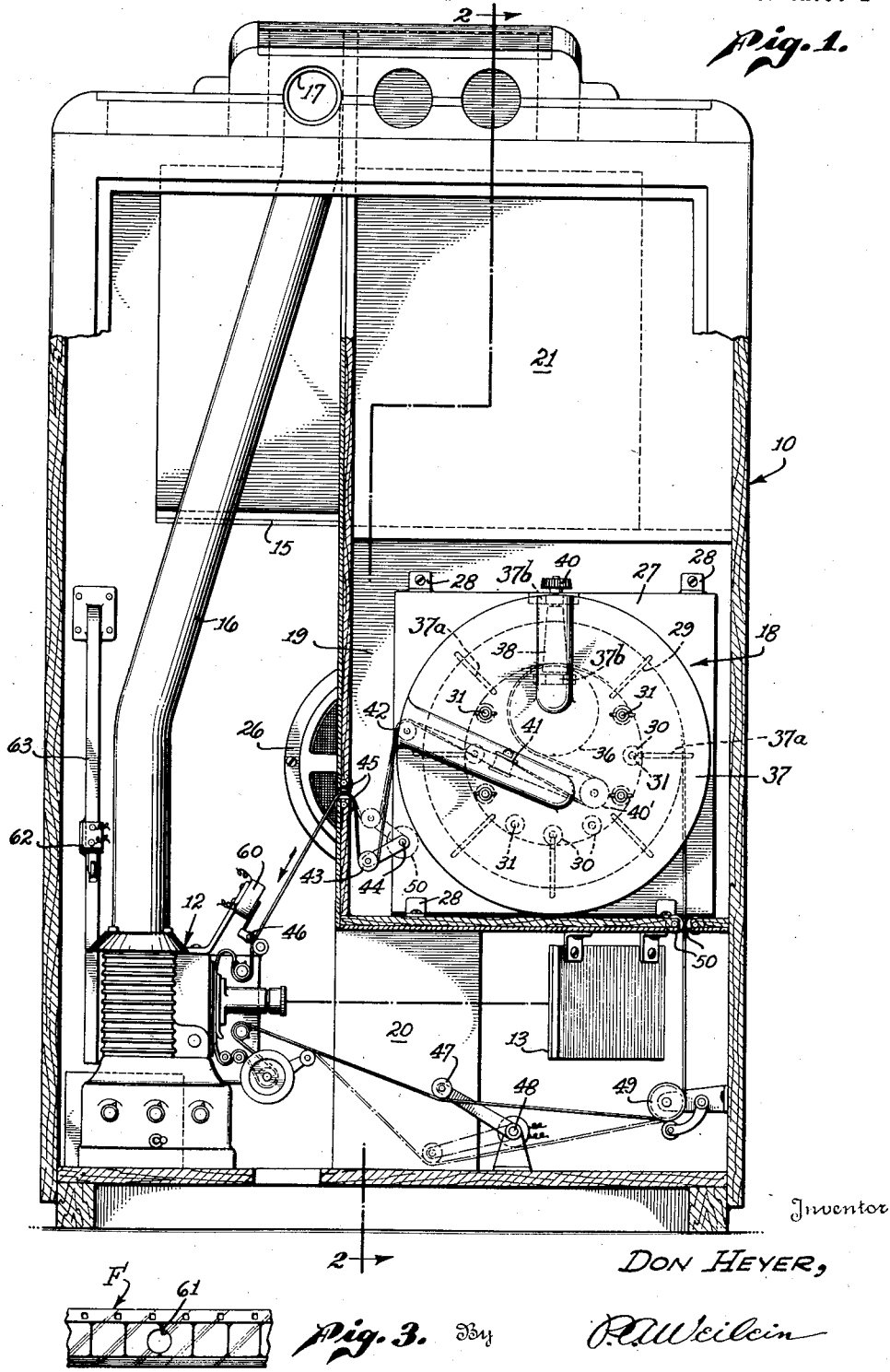

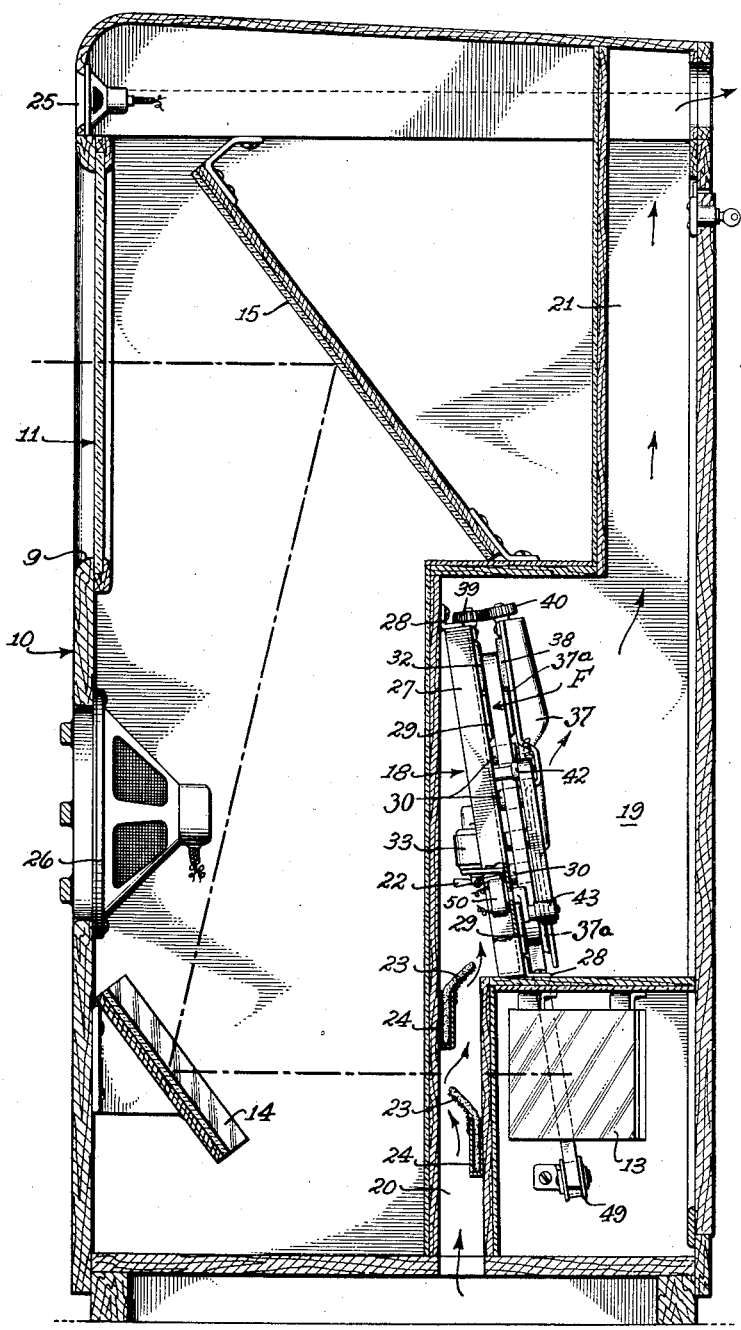

Oct. 26, 1943.   D. HEYER   2,332,717
CONTINUOUS FILM EXHIBITOR
Filed Sept. 16, 1940   4 Sheets-Sheet 4
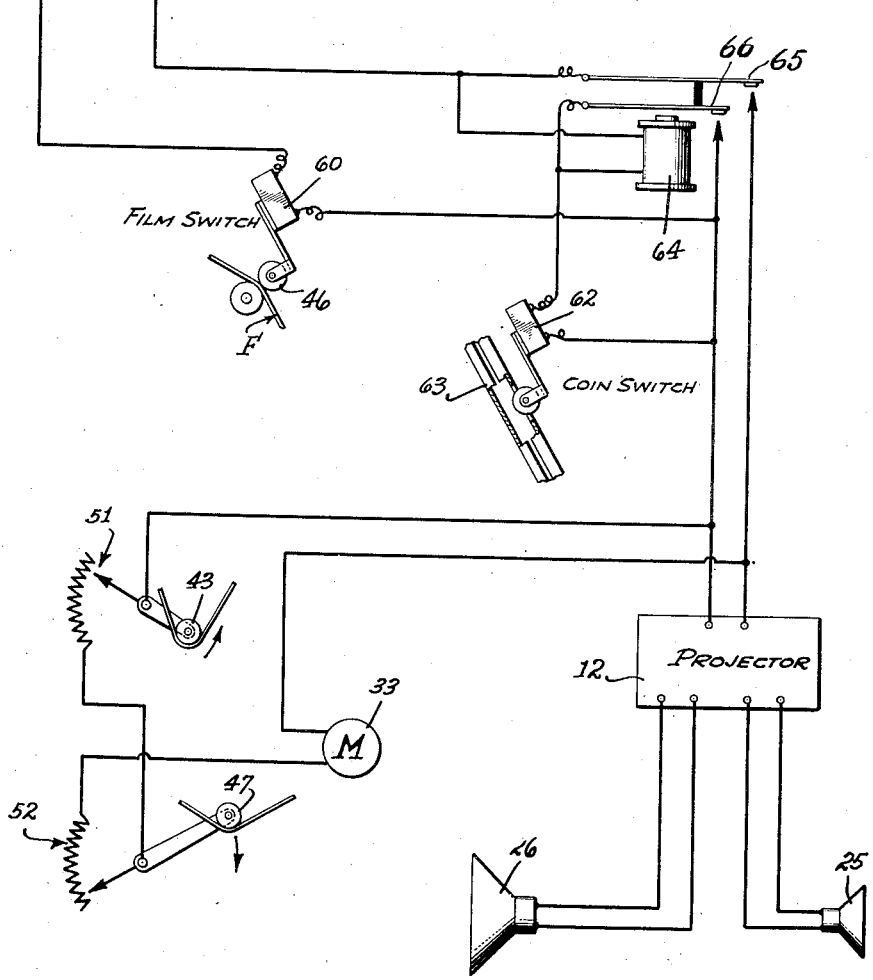
Inventor
DON HEYER,
By R. A. Weilein
Attorney Patented Oct. 26, 1943

2,332,717

UNITED STATES PATENT OFFICE 2,332,717

CONTINUOUS FILM EXHIBITOR

Don Heyer, Hollywood, Calif.

Application September 16, 1940, Serial No. 356,949

10 Claims. (Cl. 88—18.7)

This invention relates to motion picture projectors particularly of the type in which the ends of the film are joined together to give a continuous reel for repeated showing without rewinding, such as, for example, coin operated exhibitors.

In previous mechanisms of this type film has been drawn from the film magazine to the projector by means of positively driven sprockets engaging the perforations in the film, said sprockets being either auxiliary to or part of the projection mechanism proper.

This method of handling film has a disadvantage of being extremely wearing on the film perforations, especially in view of the repeated showings of film of this nature. In addition, this method of handling film limits to a very great extent the footage of film which may be properly handled in the magazine.

It is, therefore, a primary object of this invention to provide means for supplying film from a reel to a projector without the use of sprockets for removing the film from the reel.

It is a further object of this invention to provide a mechanism in which the film is supplied to the projector automatically as needed.

It is a further object of this invention to provide a mechanism for automatically taking up the film from the projector as required.

In previous machines of this type the use of a continuous film has led to considerable difficulty in preventing the successive layers of film of the reel from binding against each other. As, in devices of this type, the film must be drawn from one periphery of the reel and taken up on the other, and as the two peripheries are different in length, the rotational speed of the two peripheries must be different. Consequently, the successive layers of film in the reel must slip past each other. As no provision is made for promoting separation of the successive layers of the film on the reel such slippage will result in damage to the surfaces of the film and consequent deterioration of the quality of the projected image.

It is, therefore, a further object of this invention to provide a means which will obviate the binding between adjacent layers of film on the reel.

In mechanisms of the type involvevd in this invention, the film magazine and the projector proper are mounted in a comparatively confining cabinet and the heat from the projector lamp is sufficient to damage the film in the magazine.

It is, therefore, a further object of this invention to provide means for protecting film from the heat generated by the projector lamp.

It is a further object of this invention to provide means for decreasing the tendency of the film to dry and shrink in the atmosphere of the cabinet.

It is a further object of this invention to provide a speaker mechanism which will have an effect of naturalness without the necessity of placing the speaker behind the projection screen.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Figure 1 is a rear elevation, partly in section, of a device embodying the present invention;

Figure 2 is a vertical sectional view taken along lines 2—2 of Figure 1;

Figure 3 is a fragment of the film utilized in connection with this invention;

Figure 7 is a wiring diagram of the entire device.

Figures 4, 5, 6:
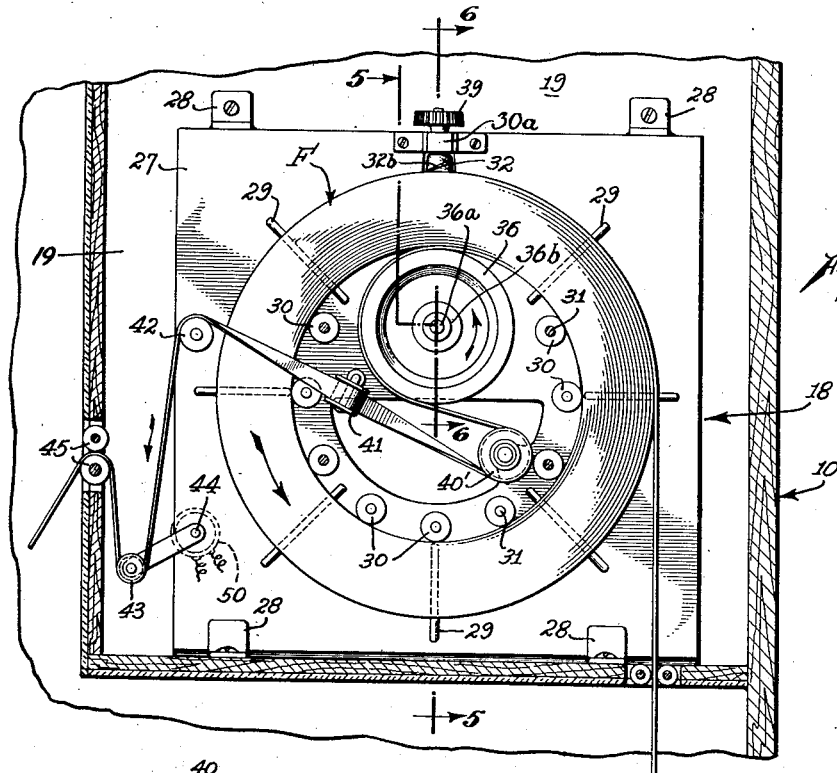
Figure 4 is an enlarged detail of the film magazine, some of the parts being removed.
Figure 5 is a section through the film magazine taken along lines 5—5 of Figure 4.
Figure 6 is an enlarged view similar to Figure 5, taken on line 6—6 of Figure 4.

The device includes a cabinet 10 having mounted on the front side thereof over an opening 9 a translucent screen 11 for viewing images projected thereon by means of a projector 12, the images being transmitted to the screen by means of reflectors 13, 14, and 15. The projector is of conventional design and is connected to a conduit 16 leading to a discharge opening 17 preferably in the upper portion of the cabinet for carrying off heat generated by the projector lamp. The conduit 16 is also provided with a hood 16' and openings in its walls under the hood to draw air into the conduit to promote passage of air past the exterior of the lamp house.

In order to provide a supply of film to the projector a film magazine, generally designated 18, is provided within the cabinet 10, and is of such construction and arrangement as to permit an effective feeding of film to and from the projector. It will be noted that this magazine is contained within a separate compartment 19 having insulated walls isolating it from the remainder of the cabinet interior. This is done in order to protect the film F from the heat generated by the projector lamp. The film is contained in the magazine 18 in the form of a coil comprising a multiplicity of loops, and said film is played out of the coil through the projector and back onto the coil in a manner hereinafter fully described. It is desired to maintain all surfaces of the coiled film cool to ensure a proper feeding of the film and to prevent heating of the film due to friction caused by relative movement between the adjacent loops during the feeding operation. Some means for maintaining the surfaces of the film in cooled condition is particularly essential when the film magazine contains a large number of loops occasioned by a large number of subjects. In the present instance, cooling of the film is effected by circulating air through the loops of the coiled film. This is accomplished by the provision of intake and discharge conduits 20 and 21 leading to and from the magazine compartment 19. Air is caused to pass up the conduit 20 through the loops of the coiled film F and out through the discharge conduit 21 by means of a fan 22 which is suitably mounted on one side of the film magazine 18. Additionally, it has been found that the life of the film will be prolonged and the surfaces better preserved if the surrounding air is somewhat moist. In order to humidify the air and condition it for passage through the coiled film, a number of wicks 23 are positioned at spaced intervals along the intake conduit 20. These wicks extend into holders 24 containing liquid which feeds capillarily through the wicks, and the upper ends of said wicks extend angularly across the conduit so that the air passing therethrough follows a more or less tortuous path and picks up the required amount of moisture upon passing over the moistened surfaces of the wicks. Furthermore, passage of the air over the surfaces of the moistened wicks results in its cleaning preparatory to its passage through the film, since air borne particles adhere to the moistened surfaces of the wicks, thus reducing the possibility of the particles settling on the film.

The remaining cabinet structure is for the purpose of providing a suitable source of sound to accompany images thrown on screen 11. As screen 11 is positioned approximately at eye level and as no speakers can be placed behind the screen without interfering with the images cast thereon, the effect of naturalness which comes from placing the speaker behind the screen must be achieved by other methods. In the present instance this has been done by the use of two speakers, one of which is adapted to successfully respond to high frequency components of the sound being reproduced, and the other of which is adapted to respond to the lower frequency components. The high frequency speaker 25 is of comparatively small size and may be mounted near the screen 11, as shown in Figure 2 immediately above the screen 11. It is a noticeable characteristic of high frequency speakers that they have a tendency to be directional and the sound cast by them is confined to a comparatively narrow region. For this reason, the high frequency speaker is positioned as close to the screen as possible and at approximately ear level so that the high frequency sound appears to come directly from the images cast upon the screen by the projector. The small size of a speaker capable of successfully emitting high frequency sounds permits the location shown. However, the sound emitted by a high frequency speaker is of unsatisfactory quality alone, and a low frequency speaker 26 is also provided for use in conjunction with the high frequency speaker and the projector. This low frequency speaker 26 may be mounted in any convenient place in the cabinet 10. It has been shown as mounted in the front of the cabinet below the screen 11 in a position to avoid interference with the images cast by the projector upon the screen 11. This position is satisfactory for a speaker intended to emit low frequency components of sound to accompany the images cast upon the screen as low frequency speakers have the characteristic of emitting a comparatively broad band of sound, and the source of such sound is not readily located by the ear. The speaker 26 can therefore be located in any position which is mechanically expedient.

Returning now to the magazine and projector, the magazine 18 has a base member 27 which is mounted on the walls of the magazine compartment 19 by means of brackets 28. It will be noted that these brackets support the base in inclined position. This is done in order that the proper looseness between adjacent layers of the coil will be maintained at the bottom, the looseness at the top being attained by a means hereinatfer described. This base member 27 has a series of guide members 29 mounted thereon to space film from the base member 27. Arranged in a circle is a series of film guide rollers 30 which may have their edges raised so that they engage the surface of the film near the edges only to avoid scratching the film. These guide rollers are preferably rotatably mounted on the base member 27 by means of pins 31. The guides 29 and guide rollers 30 cooperate to support the coil of film F in the position shown in the figures and allow it to rotate freely. Revolubly mounted on the base member 27 by means of bearings 30a is a tapered driving roller 32 which is driven by a motor 33 through a gear reducer 34 and an overrunning clutch 35. This motor may be the same motor which drives the fan 22. The roller 32 is arranged to engage the edge of the film coil, as shown in Figures 5 and 6. Also revolubly mounted on the base member 27 is a driving roller 36 which may be secured to the base member by means of a stud 36a carrying a bearing 36b in order that the roller be freely rotatable. This roller also has raised edges to prevent scratching the face of the film. The tapered roller 32 and the driving roller 36 are so arranged that the roller 32 engages the side face of the roller 36 as at 32a (Figures 5 and 6) and causes its rotation. A cover plate 37 is secured to the base member 27 preferably by means of wing-nuts engaging some of the pins 31 which may have their ends threaded for that purpose. This cover plate may be provided with a series of guides 37a similar to the guides 29 on the base member. Revolubly mounted on the cover member 37 by means of bearings 37b, a tapered roller 38 also engages the side of the driving roller 36 and the edge of the coil of film. This arrangement of the roller 38 on the cover plate 37 permits ready removal of the coil of film when the cover plate 37 is removed, and at the same time provides a stable mounting for the roller 38 when the cover plate is in place. Rollers 32 and 38 carry a pair of meshing gears 39 and 40 transmitting motion from roller 32 to roller 38. The tapered rollers 32 and 38 carry on their faces spirally disposed ridges 32b and 38b arranged as shown in Figure 6 for a purpose which will presently appear. These ridges are so arranged that during the rotation of the tapered rollers the spirals travel upwardly.

The film passes from the interior of the endless coil F surrounding the guide rollers 30 and the driving roller 36 and is taken up on the outer periphery of this coil. In order to successfully accomplish the guiding of the film from the magazine to the projector and back again, a series of rollers is provided in the path of movement to and from the projector. A roller 40' receives the film from the driving roller 36 and a pair of rollers 41 and 42 serve to guide the film in its path to the projector. A roller 43 is mounted on an arm which pivots as at 44 and serves to maintain the film leaving the magazine in proper tension. The film passes between rollers 45 to a switch roller 46 which has a purpose presently to be described. From thence it passes to the projector sprockets, and thence to another roller 47 mounted on an arm pivoted as at 48 which serves to keep the film leaving the projector under proper tension. The film passes from roller 47 about a guide roller 49 and thence through the walls of the projector compartment between rollers 50 which serve to guide it to the outer periphery of the coil of film in the magazine.

Each of the movable rollers 43 and 47 has a rheostat operatively connected to the arm of the roller so that changing the tension of the film engaging either of these rollers causes a change in the resistance of such rheostats. As shown in Figure 7 the rheostat 51 operated by roller 43 has its resistance decreased as tension on the film passing under the roller 43 increases raising the roller 43. The rheostat 52, however, is so connected that a decrease in the tension of the film leaving the projector results in a lowering of the roller 47 and a decrease in the resistance of the rheostat 52. These two rheostats are connected in series and are connected to the motor 33 so that a decrease in the resistance in either of the rheostats 51 and 52 will cause the motor to increase in speed with a consequent increase in speed of the film coil. It is, of course, realized that the speed of the film coil can be controlled in some other manner, but the purpose intended to be served is that the film coil shall increase in speed when the film leaves the magazine with too great a tension, and that the film coil shall likewise increase in speed when the film is returning to the magazine under too low a tension.

The manner of operation of the device should now be clear. Film is fed from the magazine to the projector, the two rollers 32 and 38 in conjunction with roller 36 tending to bodily rotate the coil of film in the magazine. As shown in Figure 4, the film passes about the driving roller 36 in its passage to the projector sprockets. If the roller 36 be considered as rotating it can be readily seen that increasing the tension on the film will cause the roller 36 to drive the film, much in the manner of a windlass or capstan. Thus, the driving roller 36 tends to automatically drive the film as it is drawn from the magazine by the projector sprockets, and also tends to automatically cease driving if the projector for any reason draws the film from the magazine at a less speed than the roller 36 normally delivers it. At the same time, the two rollers 32 and 38 tend to drive the bulk of the coil bodily about the magazine. As the peripheral speed of the film on the outer periphery of the coil and that on the inner periphery of the coil should be equal in order that a constant amount of film be maintained on the coil, it is necessary that the rotational speed of the outer periphery be less than the rotational speed of the inner periphery. That being so, there is a sliding action of the layers of film on the coil. Such sliding action is not possible unless some means is provided for maintaining the film in a separated condition. One means of accomplishing this is by providing spiral ridges on the two rollers 32 and 38 which tend to lift the film by the edges as the rollers rotate and have a sort of riffling action on the film, thus tending to maintain the layers separate at the top of the coil and allowing easy slippage. It will be noted that the rollers 32 and 38 are tapered. The film on the coil tends to rotate as a body and it is necessary to increase the speed of the film near the center of the coil and decrease it at the outer periphery in order that the film be drawn from and delivered to the projector at the same surface speed. The tapered rollers accomplish this change of speed.

The film coil is therefore driven, which removes the strain from the projector sprockets, and, consequently, preserves the film. The two rheostats 51 and 52 are intended to control the speed of rotation of the film coil to meet the normal projector requirements. However, under certain conditions the projector requirements may be such that the motor 33 will not respond rapidly enough to the change in tension of the film feeding to or away from the film magazine. In this event, if the film coil is driven by the motor 33 at an insufficient speed the projector will pull the film off the coil for a short period of time, which is permitted by the action of the overrunning clutch 35. The clutch 35 and the driving roller 36 cooperate, so that if the film is delivered by the reel too slowly for the projector, the projector can pull the film off by merely driving the roller 36, and if the feeding mechanism delivers film too rapidly for the projector the film becomes disengaged from around the roller 36 and ceases to feed until the projector has again produced a tension on the film. These functions supplement the action of the two rheostats 51 and 52, tending to maintain the film under proper tension at all times.

This device may be coin operated and a circuit shown in Figure 7 may be used. Switch 60 is normally maintained closed by the film except during passage of an opening 61 in the film under the roller 46. A coin switch 62 normally open except upon passage of a coin through chute 63 operates a relay comprising a solenoid 64 and two contact arms 65 and 66. Upon closing the switch 62 by insertion of a coin a circuit is completed from one line of the power supply through the solenoid 64, through switch 62, through switch 60 to the other line of the power supply. This causes the solenoid 64 to attract the two armatures 65 and 66 and completes the circuit from the power supply through switch 60, through armature 66 and to the other line of the power supply. This circuit maintains the solenoid energized even after switch 63 opens after the coin has passed it. As the solenoid 64 maintains the armatures in a downward position the power supply to the mechanism is completed and the mechanism will continue to operate. However, by breaking the circuit through the armature by the opening of switch 60, which occurs when the opening 61 in the film passes under the roller 46 the solenoid becomes de-energized and the armatures are released opening the contacts which they normally close, thus shutting off the supply of power. The machine does not cease rotating instantly because of inertia of the parts and the opening 61 will pass the roller 46 when operation ceases, thus placing the machine in condition for again starting when a coin is inserted in the chute 63.

I claim:

1. In an exhibitor for continuous film, a magazine for holding film in the form of an annular coil, electric motor means for rotating said film coil in said magazine to take up film from a projector on one periphery and feed film to the projector from the other periphery, means responsive to a decrease in the length of film passing from the coil to the projector to increase the speed of said electric motor means, and means responsive to an increase in the length of film passing from the projector to the coil to increase the speed of said electric motor.

2. In an exhibitor for continuous film, a magazine for holding film in the form of an annular coil, means rotating said coil in the magazine to take up film from a projector on one periphery of the coil and feed film to the projector from the other periphery of said coil, means operated by variation in the length of film between the projector and the coil of film to vary the speed of said driving means, and means operated by variation in the tension of the film passing from one periphery of the coil to the projector for varying the speed of that periphery independently of the speed of the other periphery of the coil.

3. In an exhibitor for continuous film, a magazine for holding film in the form of an annular coil, said coil taking up film from a projector on one periphery and feeding film to the projector from the other periphery, a pair of tapered rollers engaging the opposite edges of said coil, means driving said rollers in opposite directions, said tapered rollers tending to equalize the linear speeds of the coil convolutions between the inner and outer peripheries of the coil to feed film to and receive film from the projector at projector speed.

4. A magazine for a continuous film exhibitor comprising means for holding film in the form of an annular coil, means causing rotation of said coil, a pair of rollers engaging the opposite edges of the coil, said rollers having helical projections thereon adapted to traverse the edges of the coil in a direction opposite to the direction of radial movement of the film convolutions with respect to said rollers upon rotation of the film coil.

5. A magazine for a continuous film exhibitor comprising means for holding the film in the form of an annular coil, means causing rotation of said coil, a pair of tapered rollers engaging the opposite edges of the coil, said rollers having helical projections thereon adapted to traverse the edges of the coil in a direction opposite to the direction of radial movement of the film convolutions with respect to said rollers upon rotation of the film coil.

6. A magazine for a continuous film exhibitor comprising a base and removable side, means holding film in the magazine in the form of a coil, a pair of rollers for engaging opposite edges of the coil, means mounting one of said rollers on the base of the magazine, means mounting the other of said rollers on the removable side of said magazine, and means operatively connecting said rollers for rotation in opposite directions when said side is in place on said magazine.

7. A magazine for a continuous film exhibitor comprising a base and a removable side, means holding film in the magazine in the form of a coil, a pair of rollers for engaging opposite edges of said coil of film, means mounting one of said rollers on the base of the magazine, and means mounting the other of said rollers on the removable side of said magazine, and means driving said rollers in opposite directions.

8. In an exhibitor for continuous film, a magazine for holding film in the form of a coil, electric motor means for rotating said film coil in said magazine to take up film from a projector on one periphery and feed film to the projector from the other periphery, means responsive to a variation in the length of film between one periphery of the coil and the projector to control the tension in said film length, and means responsive to a variation in the length of film between the other periphery of the coil and the projector to vary the speed of said electric motor.

9. In an exhibitor for continuous film, a magazine for holding film in the form of a coil, electric motor means for rotating said film coil in said magazine to take up film from a projector on one periphery and feed film to the projector from the other periphery, means responsive to a variation in the length of film passing from the coil to the projector to control the tension in said film length, and means responsive to a variation in the length of film passing from the projector to the coil to vary the speed of said electric motor.

10. In an exhibitor for continuous film, a magazine for holding film in the form of a coil, electric motor means for rotating said film coil in said magazine to take up film from a projector on one periphery and feed film to the projector from the other periphery, means responsive to a variation in the length of film passing from the coil to the projector, and means responsive to a variation in the length of film passing from the projector to the coil, said length responsive means cooperating to control the speed of the electric motor.

DON HEYER.